United States Patent [19]

Pfeuffer et al.

[11] 3,767,178

[45] Oct. 23, 1973

[54] FLAME CUTTING APPARATUS FOR BARS

[75] Inventors: Alfred Pfeuffer, Neu-Isenburg; Helmut Weber, Steinbach/TS; Hans Joachim Sach, Harheim, all of Germany

[73] Assignee: Messer Grieshum GmbH, Hanauer Landsbrasse, Germany

[22] Filed: Nov. 29, 1972

[21] Appl. No.: 310,600

Related U.S. Application Data

[63] Continuation of Ser. No. 71,847, Sept. 14, 1970, abandoned.

[30] Foreign Application Priority Data

Sept. 18, 1969 Germany.................. P 19 47 282.3

[52] U.S. Cl............. 266/23 K, 164/263, 266/23 M
[51] Int. Cl......................... B23k 7/10, B22d 11/12
[58] Field of Search...................... 266/23 K, 23 M; 148/9; 164/263

[56] References Cited
UNITED STATES PATENTS 3,291,470   12/1966   Lotz.................................. 266/23 M
3,382,112   5/1968   Oxley et al..................... 266/23 K X

*Primary Examiner*—Robert D. Baldwin
*Attorney*—Ernest F. Marmorek

[57] ABSTRACT

The flame cutting apparatus comprises a movable construction unit containing supporting rollers for the continuous bar to be cut off, a gas cutting torch, and clamping jaws for the bar. Stationary first and second discharging rollers are disposed in alignment with the path of movement of the bar. The leading supporting roller in the construction unit is situated ahead of the torch and at its end position it cooperates with the discharging rollers in supporting the cut-off bar section.

3 Claims, 2 Drawing Figures

—3—

FLAME CUTTING APPARATUS FOR BARS

This is a continuation of application Ser. No. 71,847, filed Sept. 14, 1970, now abandoned.

BACKGROUND OF THE INVENTION

The invention relates generally to a flame cutting apparatus for a continuous bar. More particularly, this invention relates to a supporting arrangement for the cut-off bar sections.

From prior art a flame cutting apparatus for bars is known in which at least two support rollers for the bar, the cutting torch, and the clamping means for achieving synchronous running of the bar and torch are grouped together in a constructional unit which is movable on a running track in the region of the cutting station.

A constructional unit of this kind is known from German Pat. No. 1,233,109. It has now been found that when short workpieces are cut off there is a danger that these will tip off the discharging roller set and drop into the cutting pit. This may cause damage to the cutting equipment and to the roller bed, while not inconsiderable effort is involved in retrieving this cut off bar section from the cutting pit.

SUMMARY OF THE INVENTION

An object of this invention, thus, is to provide a new and improved arrangement of the constructional unit in the flame cutting apparatus for bars which would avoid the disadvantages of prior art.

More specifically, it is an object of the invention to provide a constructional unit that can also be used for transporting short lengths of the cut off bar sections.

Another object of this invention is to provide a constructional unit in the flame cutting apparatus, which can be employed as a supporting device for guiding the leading end portion of the continuous bar through the cutting station at the beginning of the cutting operation.

Still another object of this invention is to provide a constructional unit which can be used as an additional roller bed in the region of the cutting station.

According to the invention it is proposed that at least one supporting roller should be disposed ahead of the cutting torch in reference to the direction of movement of the bar, and the distance $a + b$, where $a$ is the distance from the end of the cut-off bar section to the axial center of the front support roller in its end position, and $b$ is the distance from the axial center of the frnt support roller in the end position to the axial center of the first roller of the discharging roller set, being smaller than half the length of the shortest bar section to be cut off.

It is thereby insured that no further components are necessary for supporting the starting or dummy bar section over the cutting pit between two roller sets. The steps taken in accordance with the invention enable that the above mentioned objects are attained in the most effective manner. The solution offered by the invention enables that prior art supporting rollers, chains, or additional, lowerable rollers in the region of the cutting station can be dispensed with, and the entire installation thus becomes simplified.

In a further development of the invention it is proposed that the constructional unit be provided with a device for the adjustment of the zero position (the starting position for commencing the cut), which will enable the cut to be started from various positions along the cutting station, with the object of insuring that the supporting roller disposed ahead of the torch will be situated at the end of the running track in the immediate proximity of the discharging roller set after the completion of the cut or, in any case, at the moment when the length of the cut-off bar section passes the supporting roller. Hitherto the beginning of the cutting station was selected as a starting position for all cuts, while the end of the cut occurred at various positions in the region of the cutting station depending on the casting speed, the cutting speed, and the cross-section to be cut.

The apparatus according to the invention, in conjunction with the additional roller, thus enables that the end of the cut is situated within the cutting station in such a manner that the length of the cut-off bar section is prevented from projecting from the discharging roller set into the cutting station.

The length of the cutting station is designed with a safety margin, since due to different qualities of the bar material, an interruption of cutting must in some cases be expected, and it should be possible to repeat the cut in this case; in cases where the cutting proceeds normally and is not interrupted, the automatic clamping device remains connected to the bar even after the completion of the cutting until the condition is fulfilled that the center of gravity of the length of the cut-off bar section lies on the discharge roller set, subsequently, the automatic flame cutting device returns to its starting position.

In the case of very short bar sections when it is to be feared that the unsupported front end portion of the bar will sag as the bar moves froward and before the new cutting commences, a simple control enables the automatic flame cutting device to be retained at the end of the running track, on completion of the preceding cut, until the following bar rests on the discharging roller set.

BRIEF DESCRIPTION OF SEVERAL VIEWS OF THE DRAWING

For a better understanding of the invention, referencesis had to the following description of an exemplary embodiment thereof taken in connection with the accompanying drawing, in which.

DETAILED DESCRIPTION

Figure 1:
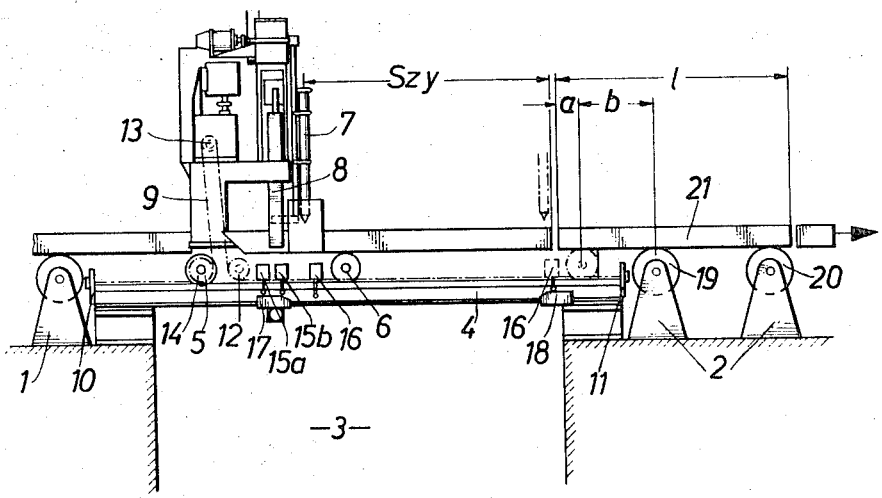
FIG. 1 is an elevational view of the flame cutting apparatus for bars in accordance with the invention.
Figure 2:
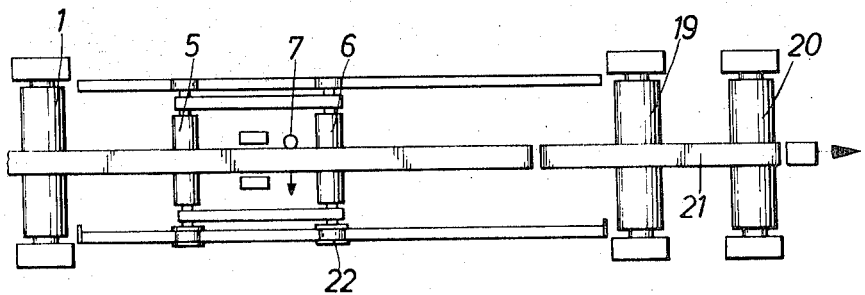
FIG. 2 is a plan view of the principal parts of the apparatus of FIG. 1.

Between a transport roller set 1, which follows the train of driving and leveling rolls (not illustrated), and the discharge roller set 2 there is disposed a cutting pit 3 of a bar flame cutting assembly. Above this cutting pit 3 there is disposed a track 4 on which a constructional unit consisting basically of supporting rollers 5, 6, a cutting torch 7, and clamping means 8 is movably supported on wheels 22 of a carriage. The constructional unit 10 is moved by means of a chain drive 9. The ends of the chain 9 are fastened at points 10 and 11 of the track and a loop of the chain runs over the guide roller 12, the drive roller 13 and a guide roller 14 disposed on the same shaft as that of the roller 5. As can be seen from the drawing, the front support roller 6, which is mounted in the same way as the supporting roller 5 on an axle shared with the wheels for the carriage, is situated ahead of the torch 7.

According to another feature of this invention, the front supporting roller 6 at the end position of the travel of the construction unit is related to the discharging roller set 2 in such a manner that the sum of the distance a from the cut-off end of the bar section 21 to the axial center of the front supporting roller 6, and of the distance b from the axail center of the front supporting roller 6 to the axial center of the first roller 19 of the discharging roller bed 2, is smaller than half the length *l* of the shortest predetermined bar section to be cut off.

In addition, limit switches 15a, 15b and 16 cooperating with adjustable cams 17, 18 are fastened on the movable constructional unit.

The mode of the bar dividing operation of the apparatus is as follows:

In the starting zero position of the constructional unit, as illustrated, clamp jaws 8 firmly connect this unit to the moving bar. After clamping has been effected the dividing cut starts and the constructional unit moves synchronously with the bar in the direction of the discharge roller set 2. Shortly before reaching the cam 18 the dividing operation is completed and the constructional unit is disconnected from the bar through the release of the damp jaws 8. In this position the supporting roller 6 and the torch 7 are situated as shown in dot-and-dash lines in FIG. 1. Together with the supporting rollers 19, 20 of the discharge roller set 2 the supporting roller 6 serves as a support for the cut off length of the bar section 21. The small cut-off bar sections are thus prevented from tipping off the discharge roller into the cutting pit 3 after cutting has been completed. As soom as the cut-off bar section 21 has left the supporting roller 6, the constructional unit returns at a high speed to its zero position; the high speed back travel is first switched off by the limit switch 5a actuated by the cam 17 and, subsequently, all movement is stopped by the action of the limit switch 15b and the cam 17. The apparatus is then ready to make another cut.

In the cutting of longer bar sections, when the major portion of the section is already situated on the roller set 2, it is not necessary to hold the constructional unit in its end position until the end of the cut-off bar section 21 is out of contact with the supporting roller 6. The limit switch can adjust the starting position of the movable construction unit so that the resulting bar advance *Szy* taking place during the cutting operation is shorter than the predetermined length *l* of the cut-off bar section 21.

It is possible for the constructional unit to return to the zero position immediately after the completion of the cutting action.

The support of the dummy bar, that is of the leading bar position before the first cut is started, is effected in the following manner: The constructional unit is in its zero position. The oncoming dummy bar or the leading position of the bar passes from the roller set 1 over the supporting roller 5 on to the supporting roller 6. The bar is then guided through the cutting station by clamping the constructional unit to the dummy bar so long, until the bar is transferred to the discharge roller set 2. The constructional unit thereupon returns to its zero position and becomes ready to start the subsequent cutting. It is also conceivable for the constructional unit to be moved in the direction of the discharge roller set 2 by means of its own drive, synchronously with the dummy bar, without being clamped to it. In the case of shorter cutting stations it is also sufficient to place the constructional unit in the middle of the running track.

The apparatus according to the invention may also be used with advantage for cutting off the end portion of the bar, since owing to the arrangement of the supporting roller 6 ahead of the cutting torch 7 only the part between the torch and the clamp jaws 8 is left over and this can simply be discarded by opening the automatic clamping device in a determined position, being for example thrown on to a scrap chutedisposed under the cutting station.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A flame cutting apparatus, for a continuous bar selectively movable in one direction, comprising in combination, stationary transport rollers, stationary discharging rollers, a movable cutting unit including wheels supporting the unit for movement in said one direction and opposite thereto between a bar receiving position adjacent said transport rollers spaced apart from said discharging rollers, and, respectively, after moving in said one direction, a discharging position adjacent said discharging rollers, said cutting unit further including two supporting rollers for the bar, said supporting rollers being mounted concentrically with said wheels; releasable clamping means for the bar, control means operable for energizing said clamping means to clamp the bar thereby to insure the temporary synchronous movement of the bar with said movable unit in said one direction, said control means including means operable for releasing said clamping means in said discharging position, at least one flame cutting torch positioned in advance of said clamping means in said one direction, one of said supporting rollers arranged in advance of said torch in said one direction at such a distance from said torch as to support a trailing end portion of a predetermined bar section to be cut-off when said unit is near said discharge position with the other end of the cut-off bar section supported by at least one of said discharging rollers, the major portion of said section in said discharge position being supported by said discharging rollers;

a chain drive including a chain extending between said receiving and discharging positions, and a drive roller mounted on said unit and engaging said chain, said chain drive being operable for driving said unit in said opposite direction.

2. An apparatus according to claim 1, further comprising a limit stop device for adjusting said receiving and discharging positions of the movable cutting unit for an optional length of the bar advance whereby said bar advance which takes place during the cutting cycle of the unit is shorter than the predetermined length of the bar section to be cut off.

3. A flame cutting apparatus according to claim 1, for cutting a bar moving in a horizontal direction from a transport roller set, said unit being horizontally movable along tracks by means of said moving bar, said torch moving transversally to the path of movement of said bar and said unit, one of said supporting rollers being positioned between said cutting torch and said discharging rollers and the other supporting roller being positioned between said cutting torch and said transport rollers and said chain being fixed at respective ends of said track.

* * * * *

UNITED STATES PATENT OFFICE
CERTIFICATE OF CORRECTION

Patent No. 3,767,178           Dated October 23, 1973

Inventor(s) Alfred Pfeuffer, et al.

It is certified that error appears in the above-identified patent and that said Letters Patent are hereby corrected as shown below:

On the cover sheet item [73] "Messer Grieshum GmbH" should read -- Messer Griesheim GmbH --.

Signed and sealed this 2nd day of April 1974.

(SEAL)
Attest:

EDWARD M. FLETCHER, JR.          C. MARSHALL DANN
Attesting Officer                 Commissioner of Patents